United States Patent
Chen et al.

(10) Patent No.: US 7,192,294 B2
(45) Date of Patent: Mar. 20, 2007

(54) CONNECTOR SET OF NOTEBOOK COMPUTER

(75) Inventors: Sheng-Feng Chen, Taipei Shien (TW); Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/299,622

(22) Filed: Dec. 13, 2005

(65) Prior Publication Data
US 2006/0203444 A1 Sep. 14, 2006

(30) Foreign Application Priority Data
Mar. 10, 2005 (TW) .............................. 94107386 A (51) Int. Cl.
*H02J 7/00* (2006.01)

(52) U.S. Cl. ....................... 439/218; 320/112

(58) Field of Classification Search ................ 439/218, 439/500; 320/107, 112, 113, 111
See application file for complete search history.

(56) References Cited

U.S. PATENT DOCUMENTS

| | | | | |
|---|---|---|---|---|
| 5,200,685 A | * | 4/1993 | Sakamoto | .................... 320/103 |
| 5,801,513 A | * | 9/1998 | Smith et al. | ................. 320/113 |
| 6,160,378 A | * | 12/2000 | Helot et al. | ................. 320/119 |
| 6,191,552 B1 | * | 2/2001 | Kates et al. | ................. 320/112 |
| 6,568,962 B2 | * | 5/2003 | Nakamura et al. | ........... 439/660 |
| 6,765,365 B2 | * | 7/2004 | Kim et al. | .................... 320/112 |

FOREIGN PATENT DOCUMENTS

TW 405784 9/2000

\* cited by examiner

*Primary Examiner*—Neil Abrams
(74) *Attorney, Agent, or Firm*—Rabin & Berdo, PC (57) ABSTRACT

A connector set of notebook computer is provided. The connector set includes a power supply connector, a host connector, a battery connector and a battery recess connector. The host connector is fixed on the notebook computer and electrically connected to the power supply connector. The battery connector is removably disposed on the notebook computer. The battery recess connector is fixed in a battery recess of the notebook computer. The battery connector is capable of being electrically connected to both battery recess connector and the power supply connector. That is, the battery connector of the invention is selectively connected to the battery recess connector or the power supply connector. Thus, the battery may be charged when disposed in the computer recess or alternatively may be removed from the computer recess and charged directly through the power supply connector.

11 Claims, 9 Drawing Sheets

CONNECTOR SET OF NOTEBOOK COMPUTER

This application claims the benefit of Taiwan application Serial No. 94107386, filed Mar. 10, 2005, the subject matter of which is incorporated herein by reference.

BACKGROUND OF THE INVENTION

1. Field of the Invention

The invention relates in general to a connector set of notebook computer, and more particularly to a connector set of notebook computer which can be selectively connected to a battery recess in the notebook computer or directly connected to a power supply.

2. Description of the Related Art

In response to the diversity of electronic products, the manufacturers are trying their best to present state-of-the-art electronic products with newer, better and more diversified functions. Of the present electronic products, notebook computers have made a big progress in terms of appearance, functions and structure.

Figure 1:
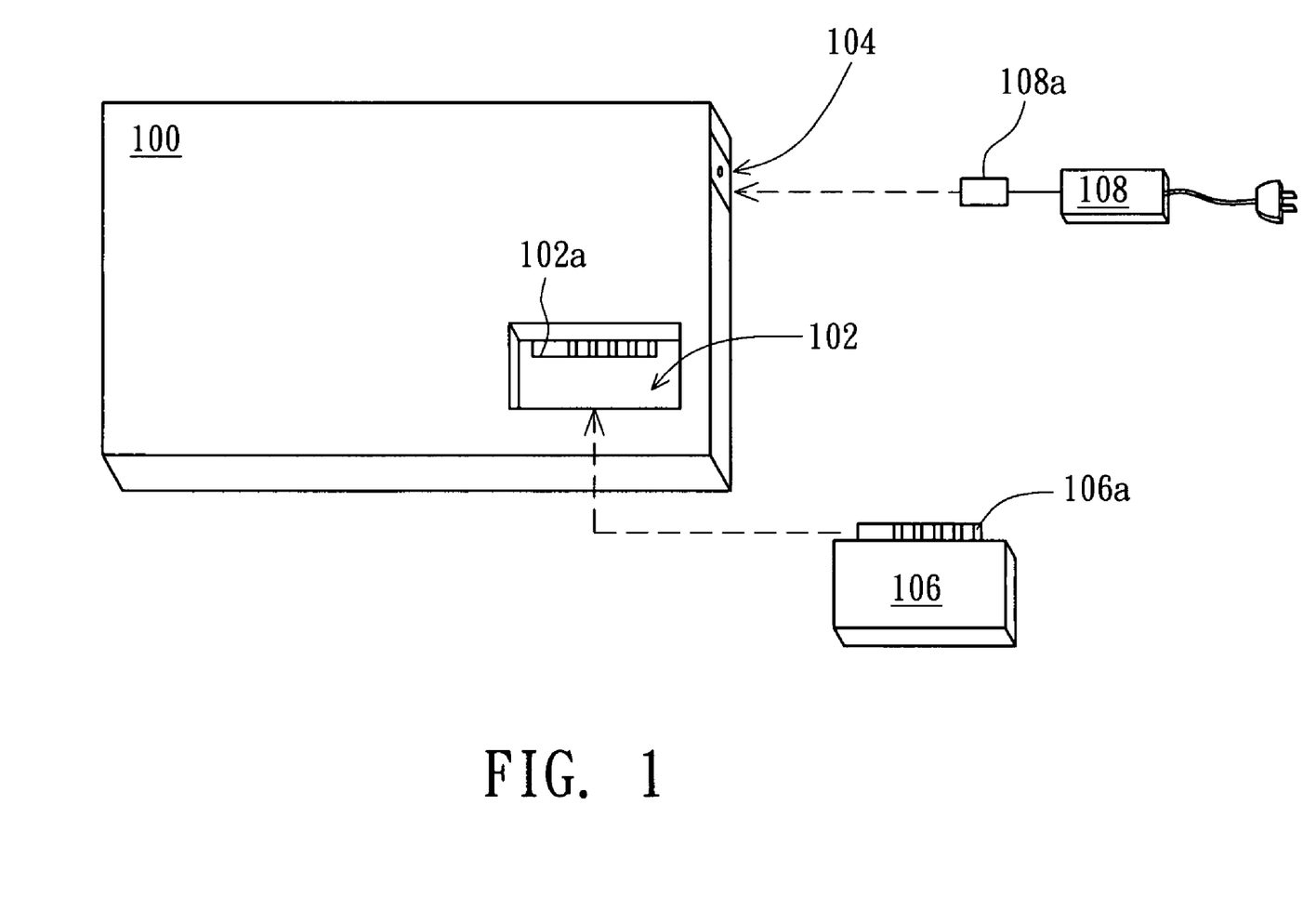
FIG. 1 is a diagram of a conventional connector set of notebook computer.

Referring to FIG. 1, a diagram of a conventional connector set of notebook computer is shown. A notebook computer 100 includes a battery recess 102, a host connector 104, a battery 106 and a adaptor 108. The battery recess 102 includes a battery recess connector 102a, the battery 106 includes a battery connector 106a, and the adaptor 108 includes a power supply connector 108a. The battery recess 102 is for receiving the battery 106. The host connector 104 is connected to the power supply connector 108a of the adaptor 108, and the battery connector 106a is connected to battery recess connector 102a. The user can provide power to the notebook computer 100 either by electrically connecting the power supply connector 108a to the host connector 104 directly or by only using the battery 106 to be electrically connected to the battery connector 106a and the battery recess connector 102a. However, it is very inconvenient that the battery 106 has to be disposed in battery recess 102 when being charged. Therefore, a connector set being more flexible in connection would largely increase the application and convenience of the notebook computer.

SUMMARY OF THE INVENTION

It is therefore the object of the invention to provide a connector set capable of selectively connected to a battery recess of a notebook computer or a power supply, for largely increasing the flexibility and convenience of the connector.

According to an object of the invention, a connector set of notebook computer is provided. The connector set includes a power supply connector, a host connector, a battery connector and a battery recess connector. The host connector is fixed on the notebook computer and electrically connected to the power supply connector. The battery connector is removably disposed on the notebook computer. The battery recess connector is fixed in a battery recess of the notebook computer. The battery connector is capable of being electrically connected to both the battery recess connector and the power supply connector. That is, the battery connector of the invention can be selectively plugged into the battery recess connector or the power supply connector.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2A:
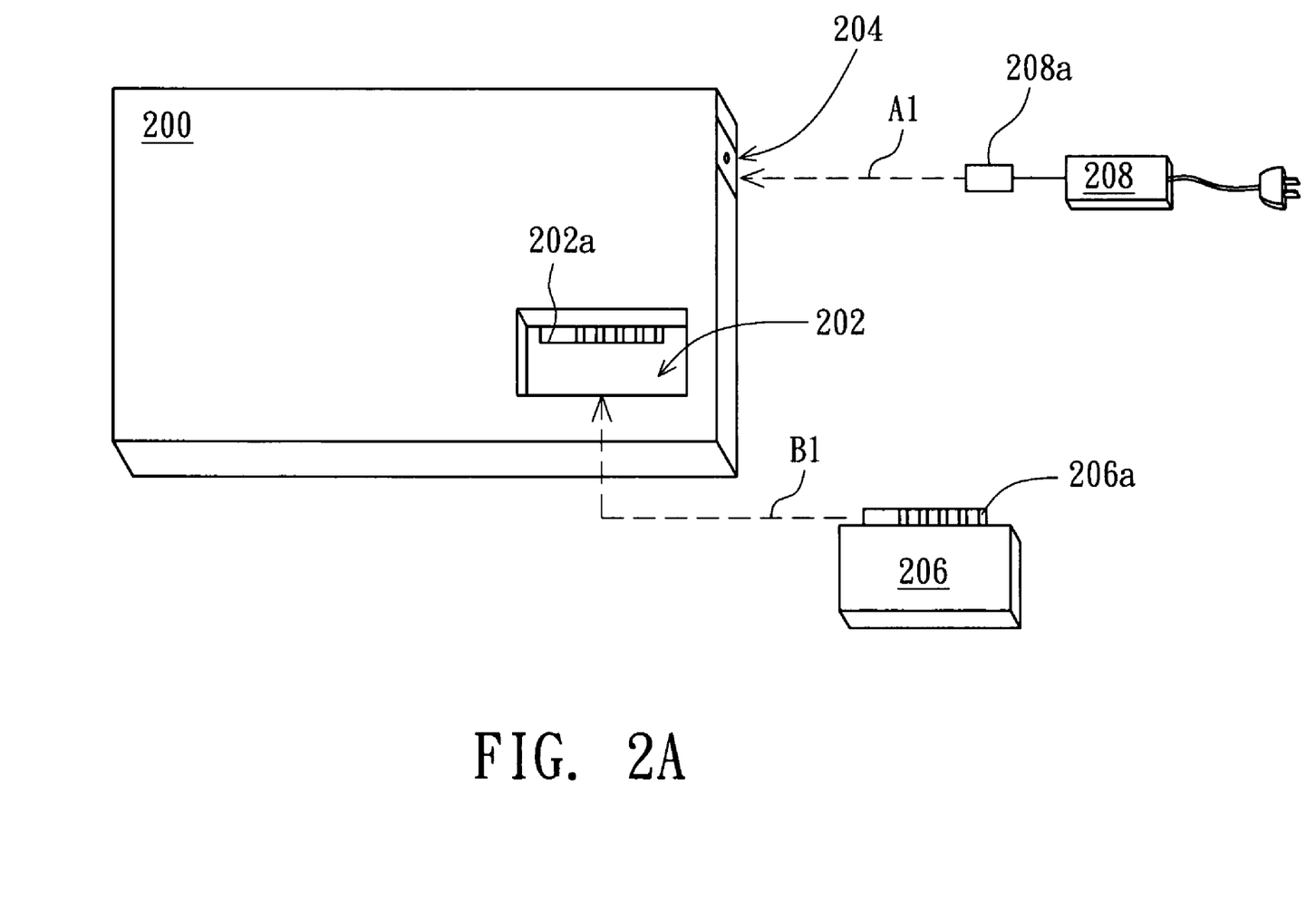
FIG. 2A is a diagram showing a connector set according to the invention being used to connect a notebook computer with a adaptor.
Figure 2B:
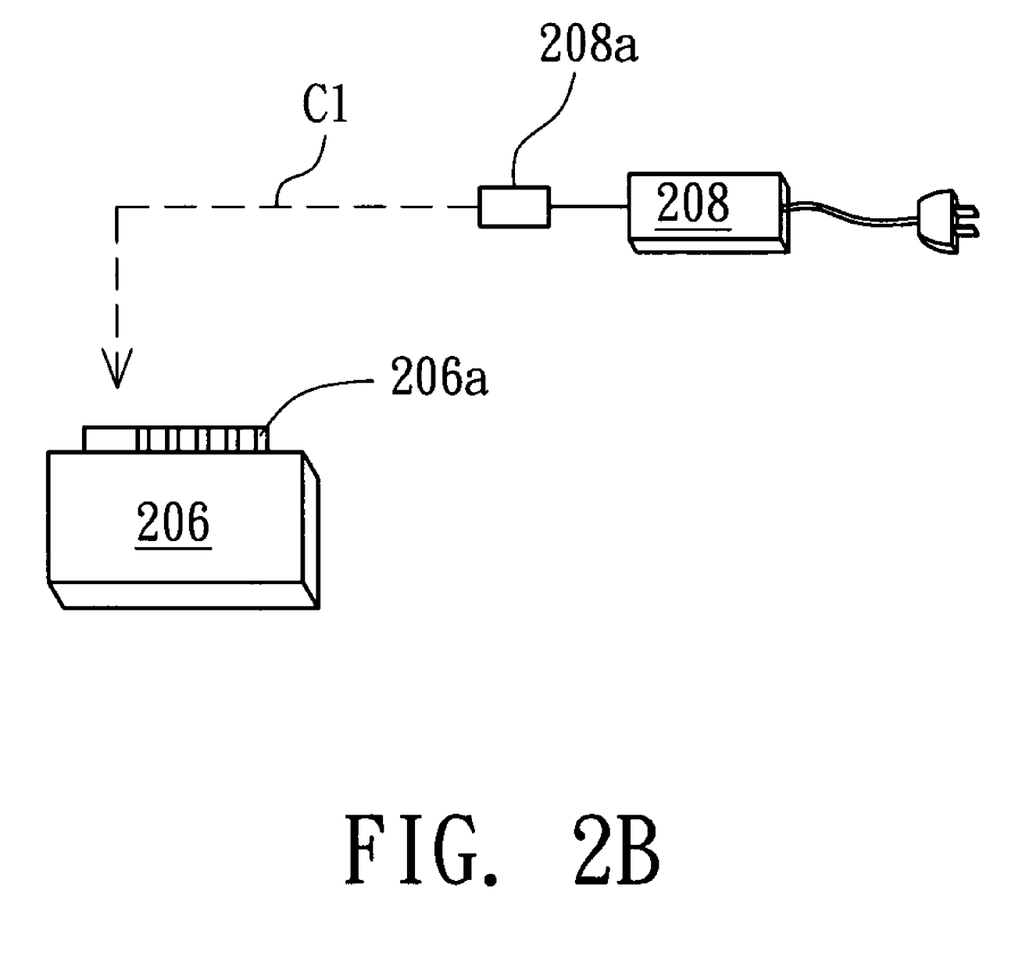
FIG. 2B is a diagram showing a connector set according to the invention being used to connect a battery with a adaptor.

Refers to FIG. 2A and FIG. 2B. FIG. 2A is a diagram showing a connector set according to the invention being used to connect a notebook computer with a adaptor. FIG. 2B is a diagram showing a connector set according to the invention being used to connect a battery with a adaptor. According to the invention, "a connector set of notebook computer", a power supply connector 208a is used to selectively connect a adaptor 208 to a host connector 204 of a notebook computer 200 or to a battery connector 206a of a battery 206. With the connector set of the invention, the user can choose to charge the battery 206 when the battery 206 is disposed in the notebook computer 200 or choose to charge the battery 206 by the adaptor 208.

As shown in FIG. 2A and FIG. 2B, the notebook computer 200 includes a battery recess 202, an adaptor 208, a host connector 204 and a battery 206. The battery recess 202 includes a battery recess connector 202a, and the battery 206 includes a battery connector 206a. The adaptor 208 includes a power supply connector 208a. The battery recess 202 is used for accommodating the battery 206. The host connector 204 is connected to the power supply connector 208a of the adaptor 208, and the battery connector 206a is connected to the battery recess connector 202a. To provide the notebook computer 200 with necessary power, the user can either connect the power supply connector 208a to the host connector 204 directly, or connect the battery 206 to the battery recess connector 202a via the battery connector 206a. Moreover, in order to charge the battery 206, the user can use the power supply connector 208a to selectively connect the adaptor 208 to the host connector 204 of the notebook computer 200 or to the battery connector 206a of the battery 206.

As shown in FIG. 2A, the battery 206 is removably disposed in the notebook computer 200, and the battery connector 206a can be coupled to the battery recess connector 202a along the direction B1. When the power supply connector 208a is plugged into the host connector 204 along the direction A1, the charging power can be transmitted to the battery 206 via the adaptor 208, the power supply connector 208a, the host connector 204, and the battery recess connector 202a. Besides, the power supply connector 208a can also be directly connected to the battery connector 206a to charge the battery 206 with along the direction C1 shown in FIG. 2B.

Figure 3:
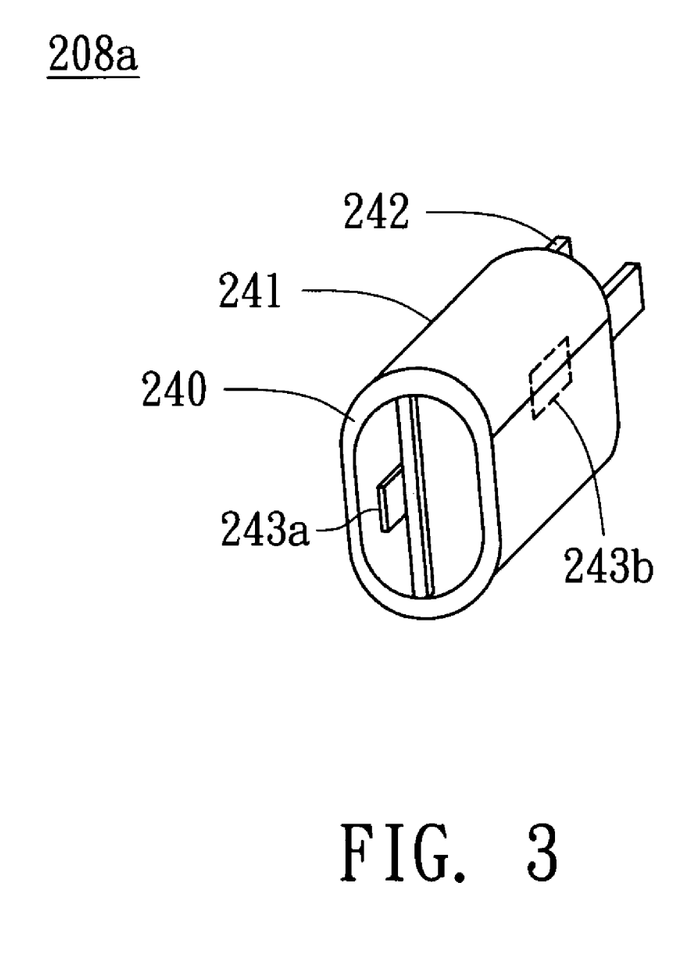
FIG. 3 is a diagram of the power supply connector of FIG. 2A and FIG. 2B.

Referring to FIG. 3, a diagram of the power supply connector 208a of FIG. 2A and FIG. 2B is shown. The power supply connector 208a includes an outer-sided metal layer 241, three inner-sided metal layers (242, 243a, 243b) and an isolation layer 240. The isolation layer 240 is positioned between the outer-sided metal layer 241 and the inner-sided metal layers (242, 243a, 243b) to prevent electrical connection between the outer-sided metal layer 241 and the inner-sided metal layer. The outer-sided metal layer 241 and the isolation layer 240 are circular-arced, enabling the outer-sided metal layer 241 to accommodate the isolation layer 240. Meanwhile, the inner-sided metal layer 242 is a plate inserted and disposed in the isolation layer 240.

Figure 4:
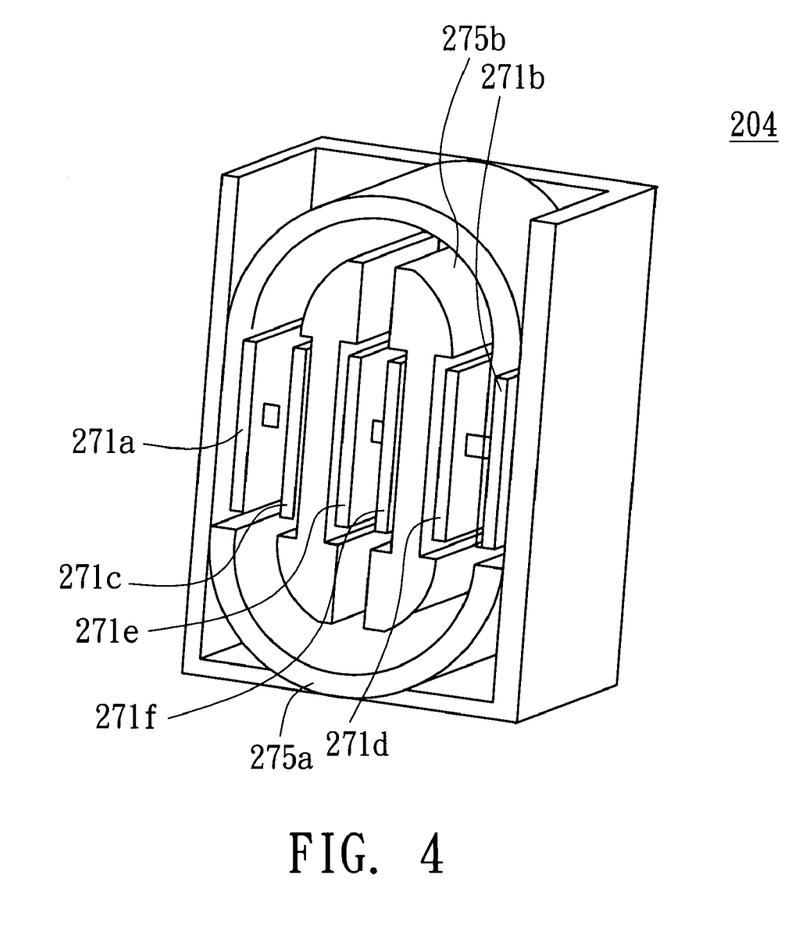
FIG. 4 is a 3-D diagram of a host connector of FIG. 2A.

Referring to FIG. 4, a 3-D diagram of a host connector 204a of FIG. 2A is shown. The host connector 204 includes a host outer layer 275a and a host inner layer 275b. Several host parallel plates 271a–271f are disposed on the host outer layer 275a and the host inner layer 275b. The host outer layer 275a and the host inner layer 275b are circular-arced so as to be corresponding to the outer-sided metal layer 241 and the isolation layer 240 of the power supply connector 208a which are also circular-arced. When the host connector 204 and the power supply connector 208a are coupled, the host parallel plates 271a and 271b disposed on the two sides of the host connector 204 are electrically connected to the outer-sided metal layer 241. The inner-sided metal layer 242 is electrically connected to host parallel plates 271e and 271f. The inner-sided metal layers 243a and 243b are respectively electrically connected to the host parallel plates 271c and 271d.

Figure 5:
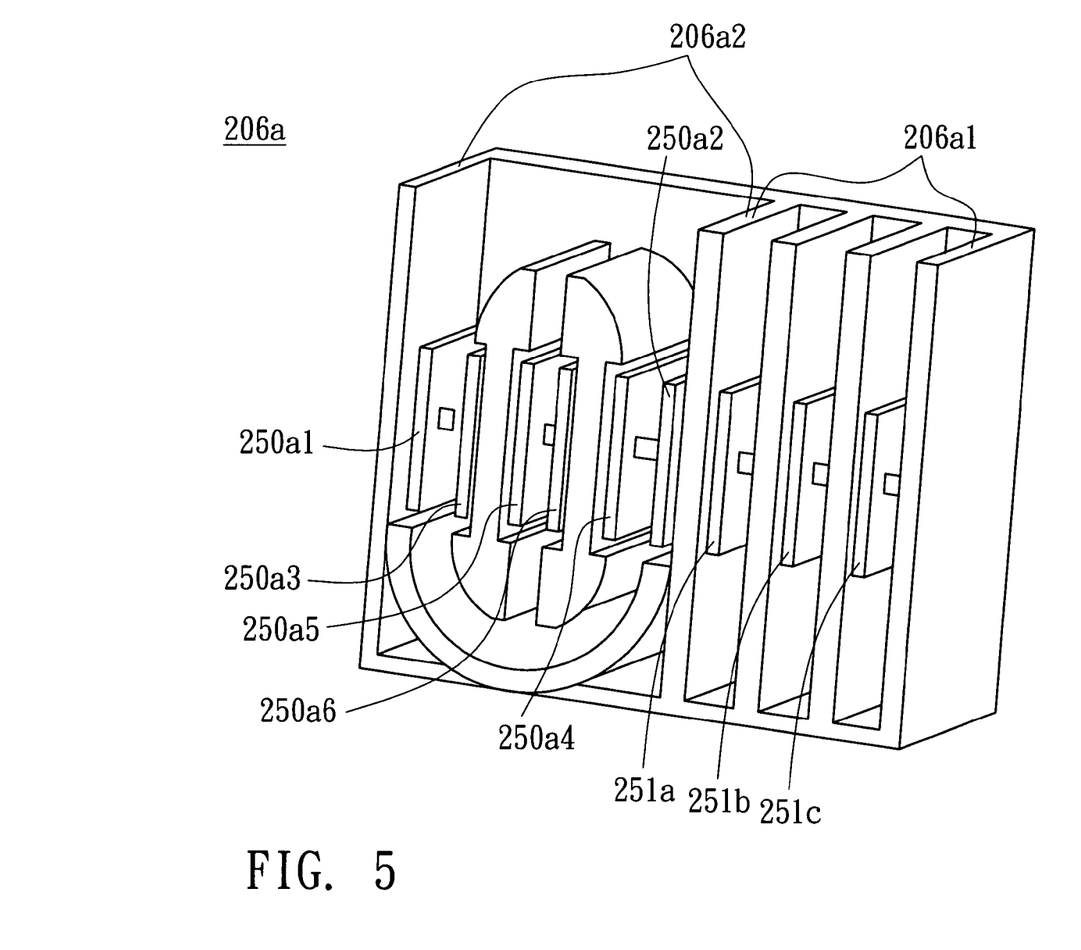
FIG. 5 is a 3-D diagram of the battery connector of FIG. 2A and FIG. 2B.

Referring to FIG. 5, a 3-D diagram of the battery connector 206a of FIG. 2A and FIG. 2B is shown. The battery connector 206a includes a first connecting region 206a1 and a second connecting region 206a2. The base of the first connecting region 206a1 is gate-knife shape, and the base of the second connecting region 206a2 is circular-arced. Several battery retaining parallel plates 250a1–250a6 and 251a–251c are positioned between the first connecting region 206a1 and the second connecting region 206a2. The first connecting region 206a1 is used for being coupled a battery recess of the notebook computer connector 202a.

Figure 6A:
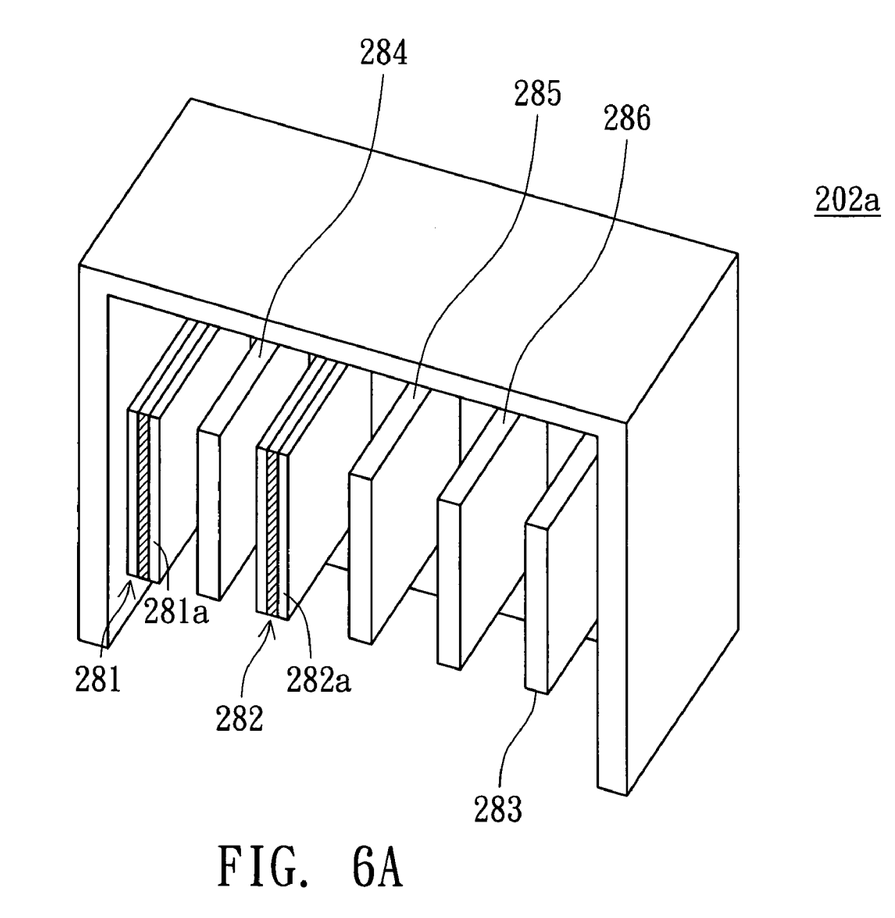
FIG. 6A is a 3-D diagram of a battery recess connector of FIG. 2A.

Referring to FIG. 6A, a 3-D diagram of a battery recess connector 202a of FIG. 2A is shown. The battery recess connector 202a includes several parallel plates, such as parallel plates 281–286 arranged in parallel like a gate-knife structure. Referring to FIG. 5 at the same time, the battery recess connector 202a can be electrically connected to the parallel plates 251a–251c of the first connecting region 206a1 via the metal layers 281a and 282a. Referring to FIG. 3 at the same time, the second connecting region 206a2 can be coupled to the power supply connector 208a. By electrically connecting the outer-sided metal layer 241 and the inner-sided metal layer (242, 243a, 243b) to the battery retaining parallel plates 250a1–250a6 respectively, the battery 206 can be charged directly via the adaptor 208.

Figure 6B:
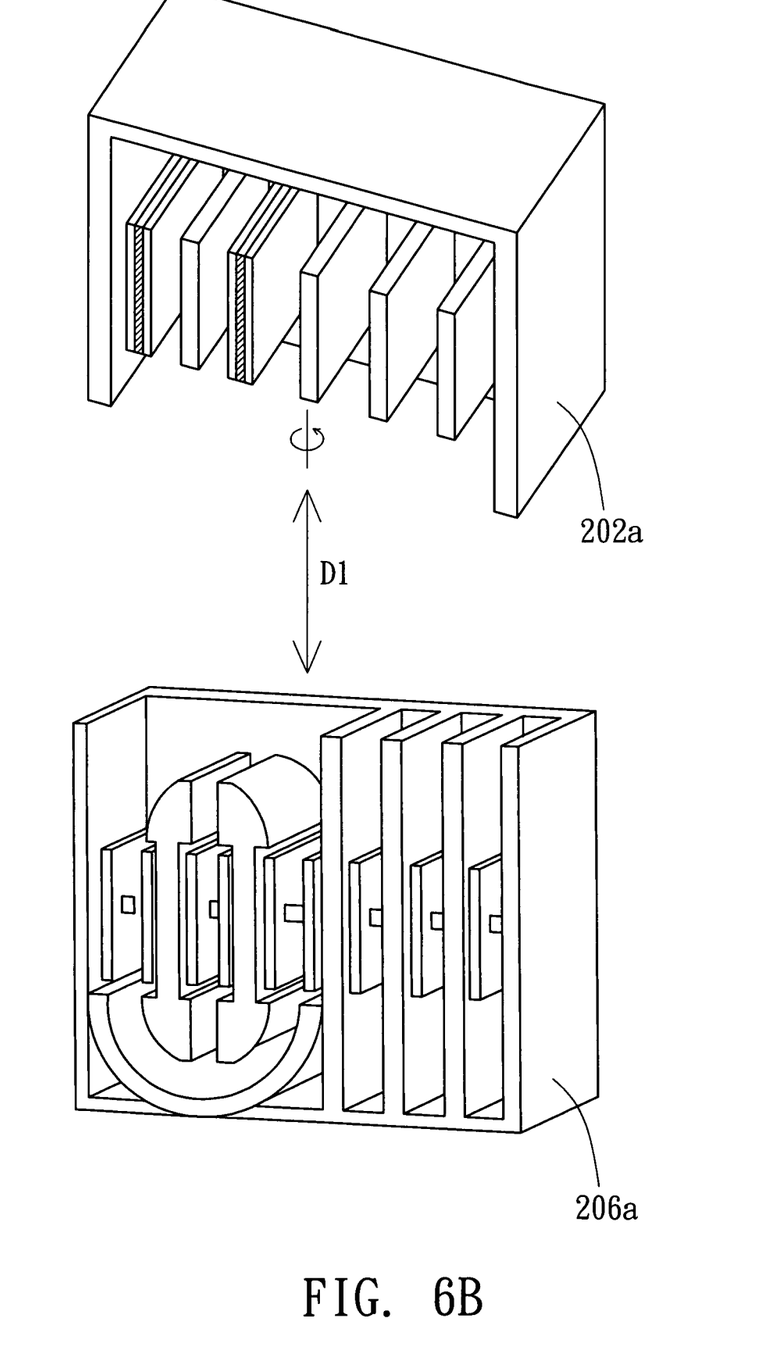
FIG. 6B is a 3-D diagram showing the battery recess connector and the battery connector of FIG. 2A being connected along a first direction (vertical direction).
Figure 6C:
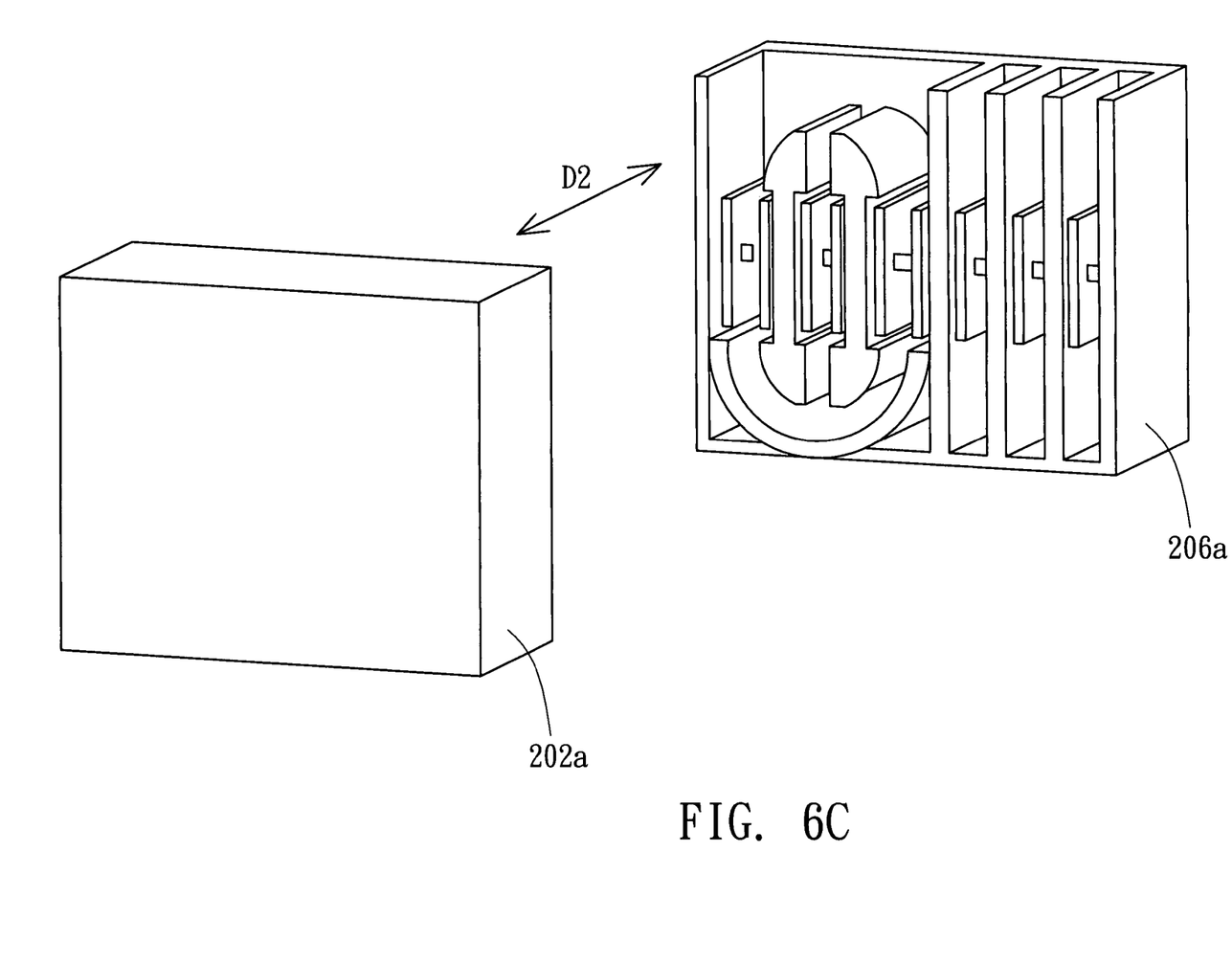
FIG. 6C is a 3-D diagram showing the battery recess connector and the battery connector of FIG. 2A being connected along a second direction (horizontal direction).

Refers to both FIG. 6B and FIG. 6C. FIG. 6B is a 3-D diagram showing the battery recess connector 202a and the battery connector 206a of FIG. 2A being connected along a first direction (vertical direction). FIG. 6C is a 3-D diagram showing the battery recess connector 202a and the battery connector 206a of FIG. 2A being connected along a second direction (horizontal direction). The base of the second charging region 206a2 of the battery connector 206a is gate-knife type, and so is the battery recess connector 202a. Therefore, the battery recess connector 202a and the battery connector 206a can be assembled along the first direction D1 and the second direction D2.

According to the connector set of the notebook computer disclosed in above embodiment of the invention, the structure of the power supply connector corresponds to the shape of the host connector and that of the battery connector, so that the power supply connector can be coupled to the host connector and the battery connector respectively, enabling the adaptor to charge the battery directly or via the notebook computer. Besides, since the battery connector and the battery recess connector can be connected in two directions, the assembly of the battery connector and the battery recess connector is thus made easier.

In the technology disclosed in above embodiment, the characteristics of the mechanical structures of the power supply connector 208a, the host connector 204, the battery connector 206a, and the battery recess connector 202a are not limited thereto. Any mechanical structure enabling the power supply connector of the connector set of the invention to selectively connect the adaptor to the host connector or the battery for the battery to be charged is within the spirit of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connector set of a notebook computer, comprising:
   a power supply connector having a first connecting end and a second connecting end, the first connecting end is for receiving a power source;
   a host connector fixed on the notebook computer; the host connector is electrically connectable to the second connecting end of the power supply connector;
   a battery connector removably disposed on the notebook computer, the battery connector comprises a first connecting region and a second connecting region, the second connecting region of the battery connector is electrically connectable to the second connecting end; and
   a battery recess connector fixed in the notebook computer, the battery recess connector being electrically connectable to the first connecting region of the battery connector,
   wherein the battery connector is selectively connectable to the battery recess connector or the power supply connector.

2. The connector set according to claim 1, wherein the power supply connector comprises:
   an outer-sided metal layer and an inner-sided metal layer; and
   an isolation layer for isolating the outer-sided metal layer and the inner-sided metal layer to be connected.

3. The connector set according to claim 2, wherein the outer-sided metal layer is spread over the isolation layer, and the isolation layer is spread over the inner-sided metal layer.

4. The connector set according to claim 2, wherein the outer-sided metal layer and the isolation layer are circular-arced respectively, the inner-sided metal layer is inserted and disposed in the outer-sided metal layer and the isolation layer.

5. The connector set according to claim 2, wherein the host connector comprises:
 a host outer layer;
 a host inner layer disposed on the inner side of the host outer layer; and
 a plurality of host parallel plates separately disposed on the host outer layer and the host inner layer, wherein the host inner layer and the host outer layer are coupled with the outer-sided metal layer and the inner-sided metal layer.

6. The connector set according to claim 5, wherein the base of the host outer layer and the base the host inner layer are circular-arced.

7. The connector set according to claim 1, wherein the second connecting region of the battery connector is adjacent to the first connecting region, the first connecting region and the second connecting region comprise a plurality of electrical parallel plates.

8. The connector set according to claim 7, wherein the base of the first connecting region is gate-knife type.

9. The connector set according to claim 7, wherein the base of the second connecting region is circular-arced.

10. The connector set according to claim 1, wherein the battery recess connector comprises a plurality of battery recess parallel plates for electrically connecting the battery connector.

11. The connector set according to claim 1, wherein the battery recess connector is gate-knife type.

* * * * *